United States Patent
Itabashi et al.

(10) Patent No.: US 7,108,426 B2
(45) Date of Patent: Sep. 19, 2006

(54) GUIDE UNIT

(75) Inventors: Shigemasa Itabashi, Kamakura (JP); Norimasa Agari, Mino (JP)

(73) Assignee: Nippon Thompson Co. Ltd., Tokyo (JP)

( * ) Notice: Subject to any disclaimer, the term of this patent is extended or adjusted under 35 U.S.C. 154(b) by 148 days.

(21) Appl. No.: 10/923,558

(22) Filed: Aug. 20, 2004

(65) Prior Publication Data

US 2005/0041896 A1    Feb. 24, 2005

(30) Foreign Application Priority Data

Aug. 22, 2003   (JP)   ............................. 2003-299130

(51) Int. Cl.
    *F16C 29/06*   (2006.01)
(52) U.S. Cl. ..................................... 384/45
(58) Field of Classification Search ............... 384/43, 384/45
    See application file for complete search history.

(56) References Cited

U.S. PATENT DOCUMENTS 6,371,648 B1 *   4/2002   Kato et al. ..................... 384/45
6,682,218 B1 *   1/2004   Ishihara ........................ 384/45
6,729,761 B1 *   5/2004   Matsui et al. .................. 384/45
6,880,975 B1 *   4/2005   Ishihara et al. ............... 384/45

FOREIGN PATENT DOCUMENTS

JP           200390338        3/2003

\* cited by examiner

*Primary Examiner*—Thomas R. Hannon
(74) *Attorney, Agent, or Firm*—Wolf Block Schorr & Solis-Cohen LLP

(57) ABSTRACT

The invention provides a guide unit in which a slider is provided on a rail. The slider comprises a casing and an end cap provided on one end of the casing. The end cap comprises a raceway path which is constituted jointly by the casing and the rail. A direction changing path is provided in the end cap and a return path is provided in the casing. An oil retaining sleeve of porous structure is inserted into the return path. The slider circulates rolling elements in the raceway path, direction changing path and oil retaining sleeve. In the guide unit, a cylindrical guide member is interposed between the direction changing path of the end cap and the oil retaining sleeve. The ratio of a length in the axis line direction of the guide member to the diameter of the rolling element may be between 0.3 to 3.0.

1 Claim, 26 Drawing Sheets

*Fig. 26*  *Prior Art*
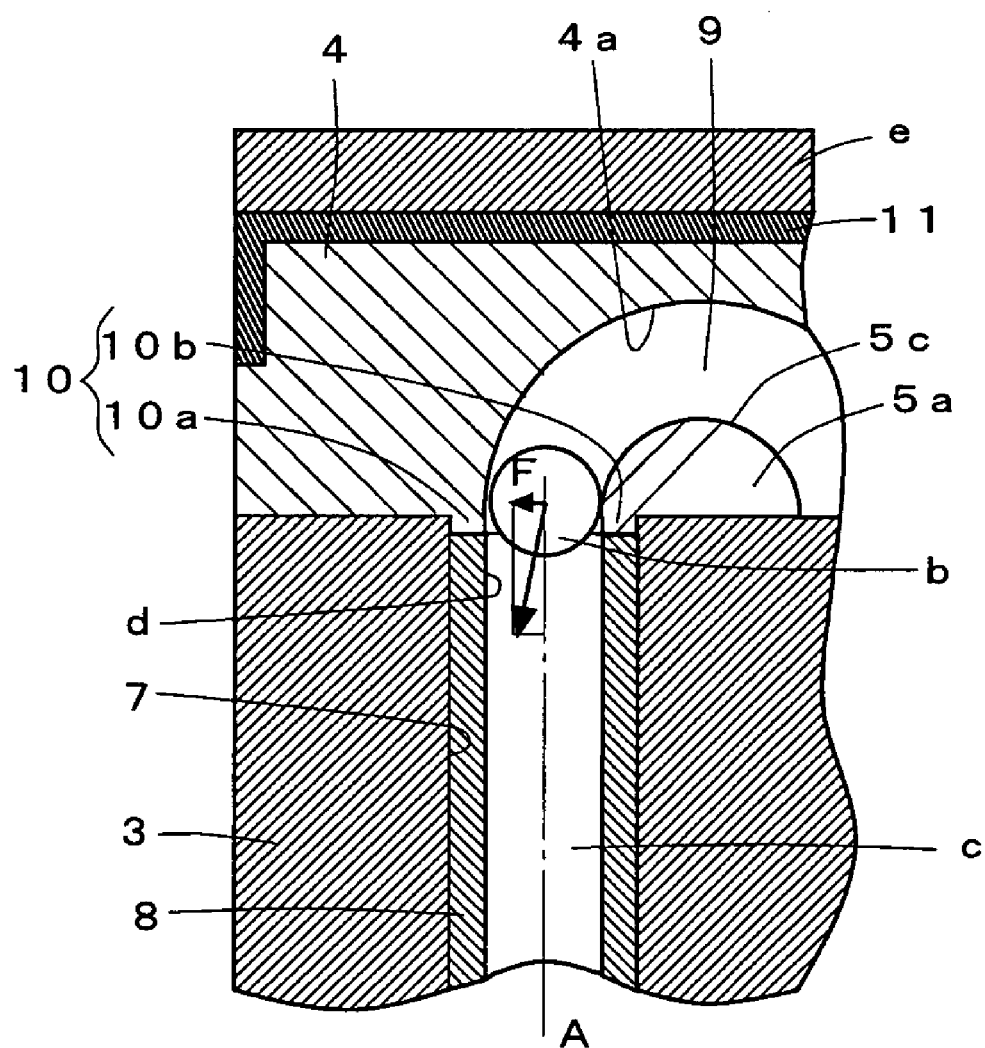

GUIDE UNIT

BACKGROUND OF THE INVENTION

1. Field of the Invention

The present invention relates to a guide unit which slidably guides a slider with respect to a rail by the rolling of a plurality of rolling units.

2. Description of the Related Art

FIG. 15 to FIG. 26 show a conventional guide unit. This guide unit is disclosed in the Japanese Patent Laid-Open No. 2003-90338 (FIG. 2).

The conventional guide unit shown in FIG. 15 is used, for example, in a straight-line guide part of a machine tool and the like and is constituted by a rail 1 fixed on a fixing part, such as a bed, and a slider 2 which fixes a moving body such as a table.

The above-described slider 2 is constituted by a casing 3, end caps 4, 4 fixed to the casing 3 via spacers 5, 5 before and behind thereof in the sliding direction, and end seals e, e which cover the outsides of the end caps 4, 4. The above-described end caps 4, 4, spacers 5, 5 and end seals e, e are fixed to the casing 3 by means of screws N, N. Also, on the bottom surface of the above-described casing 3 is formed a concavity 2a as shown in FIG. 16. And by inserting the above-described rail 1 in this concavity 2a, the slider 2 is provided so as to cross over the rail 1. Incidentally, the above-described end caps 4, 4, spacers 5, 5 and end seals e, e are also provided with quite the same concavities as the concavity 2a of the casing 3 so as to cross over the rail 1.

On side surfaces 1a, 1a of the above-described rail, there are formed raceway grooves 6a, 6a and holding band clearance grooves 6c, 6c in the axis line direction of the rail 1. As shown in FIG. 16, with the slider 2 crossing over the rail 1, raceway grooves 6b, 6b, which are opposed to the above-described raceway grooves 6a, 6a, are formed on the side surfaces of the casing 3, and these raceway grooves 6b, 6b on the slider 2 side and the above-described raceway grooves 6a, 6a on the rail side jointly constitute raceway paths a, a as shown in FIG. 17.

Furthermore, through holes 7, 7 are formed in the above-described casing 3, and oil retaining sleeves 8, 8 which contain a lubricant are inserted into these through holes 7, 7. The oil retaining sleeves 8, 8 will be described in detail later.

Incidentally, the interiors of the oil retaining sleeves 8 inserted into the above-described through holes 7, 7 constitute a return path c.

On the other hand, as shown in FIG. 18, the above-described end caps 4, 4 have circular arc grooves 4a, 4a and are provided with semicylindrical connections 10a, 10a on one side of these grooves 4a, 4a and with guide projections 20, 20 on the other side thereof.

Above the grooves 4a, 4a there are formed screw holes n, n to insert the screws N, N. And around these screw holes n, n, as shown in FIG. 19, concavities 23, 23 are formed and these concavities 23, 23 are caused to communicate with each other via a first oil groove 21.

The above-described first oil groove 21 communicates with an oil feeding hole 24, and a lubricant is supplied from this oil feeding hole 24 to the first oil groove 21. The lubricant which has been supplied to this first oil groove 21 is guided via the concavities 23, 23 to a second oil groove 22 and supplied from this second oil groove 22 to the grooves 4a, 4a.

The above-described spacer 5 is, as shown in FIG. 20 to FIG. 23, provided with a pair of passage component members 5a, 5a and the semicylindrical connections 10b, 10b.

The passage component members 5a, 5a have circular arc guide surfaces 5c, 5c as shown in FIG. 21. Furthermore, screwholes n, n are formed in the spacers 5, 5.

The spacer 5 constructed as described above is assembled to the end cap 4 as shown in FIGS. 24 and 25. When the spacer 5 is assembled in this manner, as shown in FIG. 17, the grooves 4a, 4a provided in the end cap 4 and the passage component member 5a provided in the spacer 5 jointly constitute U-shaped direction changing paths 9, 9. The direction changing paths 9, 9 formed in this manner cause one opening thereof to communicate with the above-described raceway path a and the other opening thereof to communicate with the above-described return path c. And by ensuring the communication between the raceway path a and the return path c via the direction changing path 9, the raceway path a, direction changing path 9 and return path c jointly constitute an endless circulation path. A large number of metal balls b are put in this circulation path and the balls are caused to perform rolling motions at the contact point between the rail 1 and the slider 2 to maintain smooth movement of the slider 2 with respect to the rail 1.

When the slider 2 moves as described above, the balls b roll in association with the movement. At this time, each ball b circulates continuously via the raceway path a→one direction changing path 9→the return path c→the other direction changing path 9.

Incidentally, as shown in FIG. 17, holding bands 11, 11 are mounted on the casing 3. The holding band 11 is provided to ensure that even when the slider 2 is removed from the rail 1, the balls b do not come off the raceway path a. This holding band 11 enters holding band clearance grooves 6c, 6c when the slider 2 is attached to the rail 1.

In order to maintain high accuracy movement of the slider 2 with respect to the rail 1 for a long period of time in the above-described arrangement, it is necessary not only to reduce the rolling resistance of the balls b, but also to minimize the wear of the rolls b themselves and the wear of the raceway path a and return path c on which the balls b perform rolling motions. For this purpose, it is necessary to periodically or continuously supply a lubricant to the above-described balls b, raceway path a, etc.

In the above-described conventional guide unit, optimum lubrication is maintained by building the oil retaining sleeve 8 which is impregnated with a lubricant into the through hole 7. That is, the above-described oil retaining sleeve 8 is formed from a sintered resin material of porous structure which can contain a lubricant. And the rolling of the balls b within this oil retaining sleeve 8 causes the lubricant which is impregnated in the sleeve 8 to appropriately ooze to the surfaces of the balls b. The rolling of the balls b, to the surfaces of which the lubricant is supplied, on the circulation path causes the lubricant to be supplied also to the whole circulation path.

When the spacer 5 is assembled to the end cap 4 as shown in FIGS. 24 and 25 in the conventional guide unit, the connection 10a provided on the end cap 4 side and the connection 10b provided on the spacer 5 side jointly constitute a positioning cylinder 10.

By inserting the above-described positioning cylinder 10 into the through hole 7, the position of the end cap 4 relative to the casing 3 is determined. When the position of the end cap 4 has been determined in this manner, the centers of the direction changing path 9 and the return path c coincide with each other in their respective connections.

If the center of the connection of the direction changing path 9 deviates from the center of the return path c, it follows that a level difference is produced in a boundary between the direction changing path 9 and the return path c, i.e., the oil retaining sleeve 8. If there is a level difference between the boundary between the direction changing path 9 and the oil retaining sleeve 8, then the balls b strike against the edge surface of the oil retaining sleeve 8 when the balls b pass by the boundary, and the rolling resistance is increased by this striking. The higher the rolling resistance, the more the smooth rolling of the balls b will be impaired, and as a result of this, it becomes impossible to maintain the smooth movement of the slider 2 with respect to the rail 1.

In order to prevent such a disadvantage like this, this conventional guide unit is provided with the positioning cylinder 10 and it is ensured that by use of this positioning cylinder 10 the position of the end cap 4 relative to the casing 3 is accurately determined so that the center of the direction changing path 9 and the center of the return path c coincide with each other.

In the above-described conventional guide unit, the striking of the balls b, which are circulating, against an inner wall part d near the opening of this oil retaining sleeve 8 may sometimes cause the wear of this part. That is, as shown in FIG. 26, a centrifugal force works on the ball b which has passed the U-shaped direction changing path 9 and, therefore, this ball b has a component force F in a direction orthogonal to the axis line A of the oil retaining sleeve 8. Therefore, near the opening where the ball b has rolled into the oil retaining sleeve 8, the above-described component force F remains in this ball b. In this manner, with the component force F caused to remain, the ball b which has rolled into the oil retaining sleeve 8 collides against the above-described inner wall part d near this opening of the oil retaining sleeve 8.

As described above, the oil retaining sleeve 8 has a porous structure because it is necessary to contain a lubricating oil. Therefore, the wear resistance of this oil retaining sleeve 8 is low by the amount corresponding to the porous structure. When the metal ball b collides against this oil retaining sleeve 8, the part where the collision occurred wears. And the wear of the oil retaining sleeve 8 becomes more remarkable when the moving speed of the ball b increases and when the mass of the ball b increases. If the ball b passes the inner wall part d near the opening of the oil retaining sleeve 8 which has worn, the smooth rolling of this ball b is impaired. And when the smooth rolling of the ball b has been impaired like this, this gives rise to the problem that it becomes impossible to maintain the high accuracy movement of the slider 2 relative to the rail 1. There is also another problem that noise is generated when the ball b is passing the worn portion of the oil retaining sleeve 8.

The object of the invention is to provide a guide unit which can prevent the wear of the oil retaining sleeve.

SUMMARY OF THE INVENTION

To solve the above-described object, according to the first aspect of the invention there is provided a guide unit in which a slider is provided in a rail, the slider comprising a casing and an end cap provided at least at one end of the casing, which comprises a raceway path which is constituted jointly by the casing and the rail, a direction changing path which is provided in the end cap, a return path which is provided in the casing, and an oil retaining sleeve of porous structure which is inserted into the return path, and which circulates rolling elements in the raceway path, the direction changing path and the oil retaining sleeve. In this guide unit, cylindrical guide members are interposed between the direction changing path of the end cap and the oil retaining sleeve, and the ratio of the length L in the axis line direction of the guide member to the diameter D of the rolling element, L/D, is 0.3 to 3.0.

According to the second aspect of the invention, on the basis of the above-described first aspect, the guide members are integrated with the end cap, the outside diameter of the guide members are equal to the inside diameter of the return path, and the guide members are given a positioning function.

BRIEF DESCRIPTION OF THE DRAWINGS

FIG. 26 is a partially enlarged sectional view of FIG. 17.

DETAILED DESCRIPTION OF THE PREFERRED EMBODIMENTS

Figure 1:
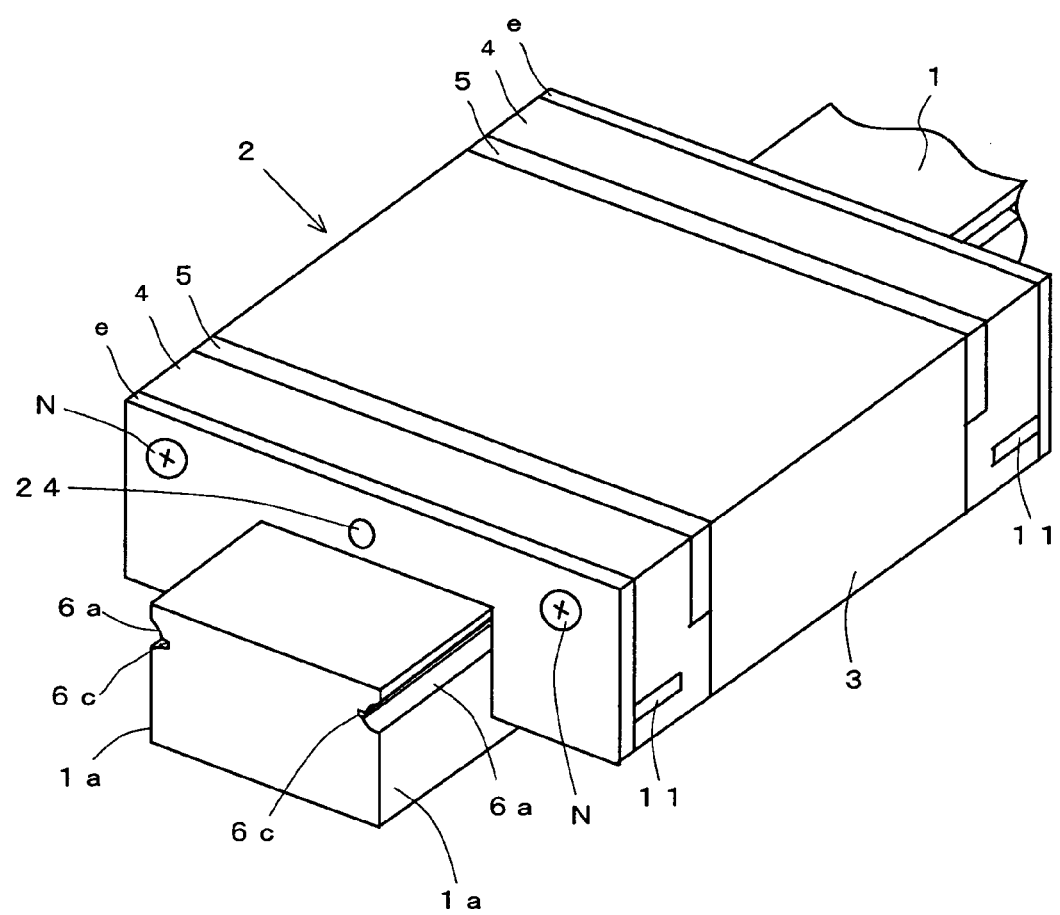
FIG. 1 is a perspective view of the first embodiment.

The first embodiment of the invention is shown in FIG. 1 to FIG. 12. Incidentally, descriptions will be given below by giving like reference characters to the same component elements as before.

The first embodiment shown in FIG. 1 to FIG. 12 is used, for example, in a straight-line guide part of a machine tool and the like and is constituted by a rail 1 fixed on a fixing part, such as a bed, and a slider 2 which fixes a moving body such as a table.

Figure 2:
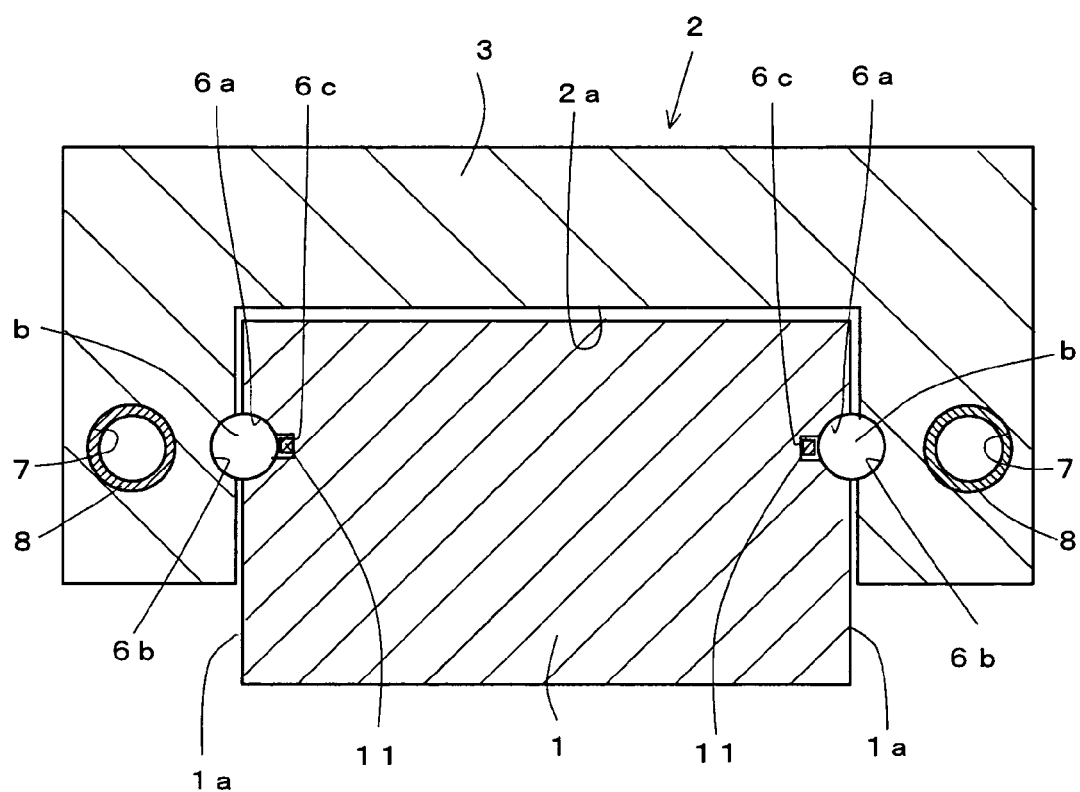
FIG. 2 is a sectional view taken along a plane orthogonal to a rail 1 in FIG. 1.

The above-described slider 2 is constituted by a casing 3, end caps 4, 4 fixed to the casing 3 via spacers 5, 5 before and behind thereof in the sliding direction, and end seals e, e which cover the outsides of the end caps 4, 4. The above-described end caps 4, 4, spacers 5, 5 and end seals e, e are fixed to the casing 3 by means of screws N, N. Also, on the bottom surface of the above-described casing 3 is formed a concavity 2a as shown in FIG. 2. And by inserting the above-described rail 1 in this concavity 2a, the slider 2 is provided so as to cross over the rail 1. Incidentally, the above-described end caps 4, 4, spacers 5, 5 and end seals e, e are also provided with quite the same concavities as the concavity 2a of the casing 3 so as to cross the rail 1.

Figure 3:
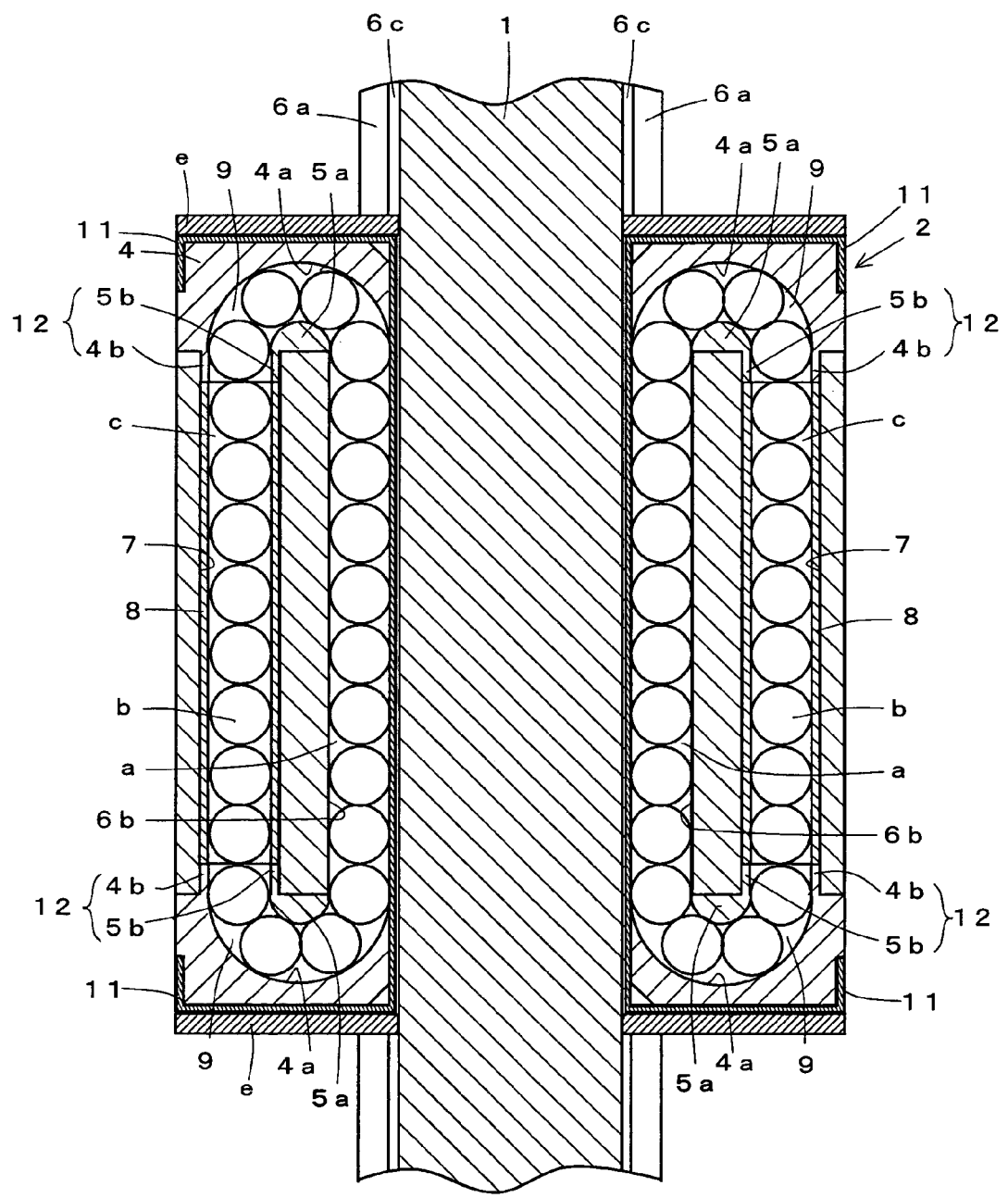
FIG. 3 is a sectional view taken horizontally to the rail 1 in the parts of holding band clearance grooves 6c, 6c in FIG. 1.

On side surfaces 1a, 1a of the above-described rail, there are formed raceway grooves 6a, 6a and holding band clearance grooves 6c, 6c in the axis line direction of the rail 1. As shown in FIG. 2, with the a slider 2 crossing over the rail 1, raceway grooves 6b, 6b, which are opposed to the above-described raceway grooves 6a, 6a, are formed on the side surfaces of the casing 3, and these raceway grooves 6b, 6b on the slider 2 side and the above-described raceway grooves 6a, 6a on the rail side jointly constitute raceway paths a, a as shown in FIG. 3.

Furthermore, through holes 7, 7 are formed in the above-described casing 3, and oil retaining sleeves 8, 8 which contain a lubricant are inserted into these through holes 7, 7. The oil retaining sleeves 8, 8 will be described in detail later.

Incidentally, the interiors of the oil retaining sleeves 8 inserted into the above-described through holes 7, 7 constitute a return path c.

Figure 4:
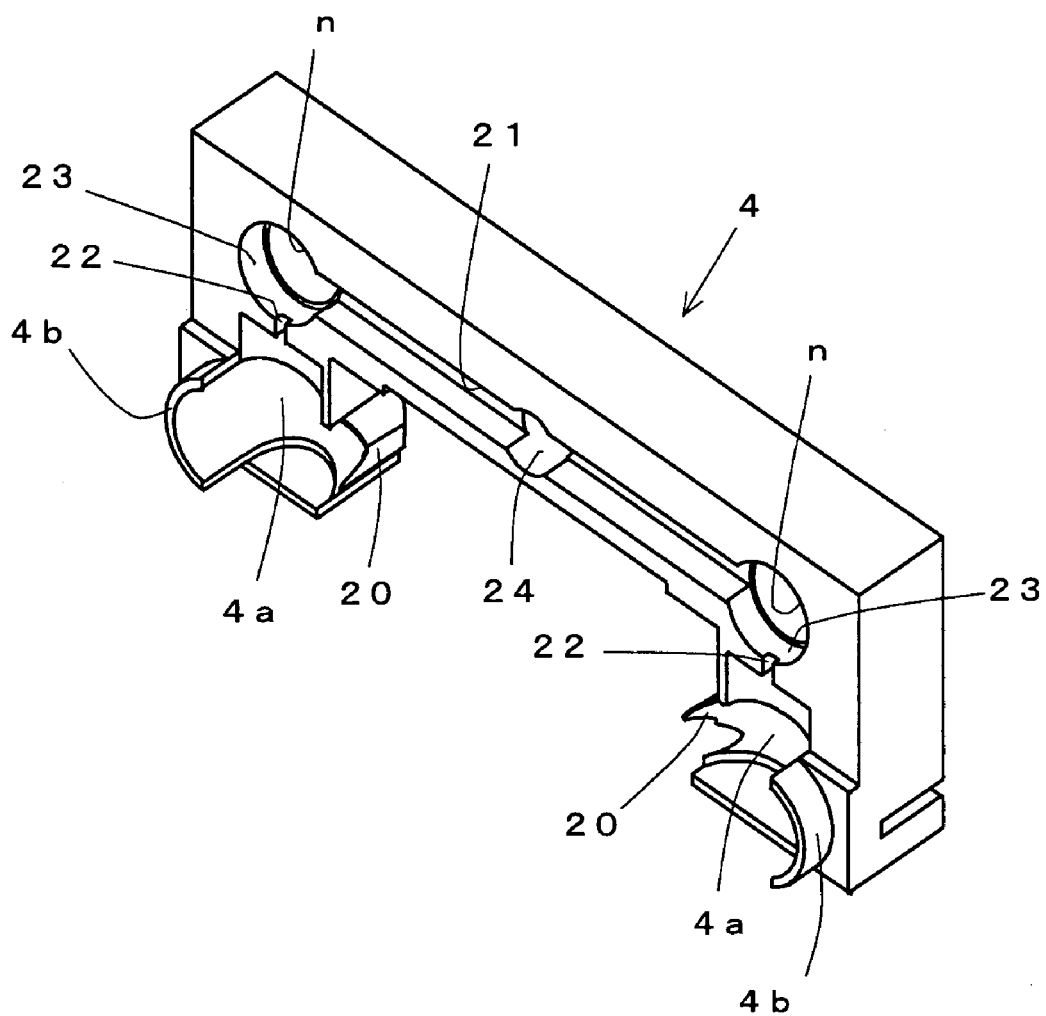
FIG. 4 is a perspective view of an end cap 4.

On the other hand, as shown in FIG. 4, the above-described end caps 4, 4 have circular arc grooves 4a, 4a and are provided with semicylindrical convexities 4b, 4b on one side of these grooves 4a, 4a and with guide projections 20, 20 on the other side thereof.

Figure 5:
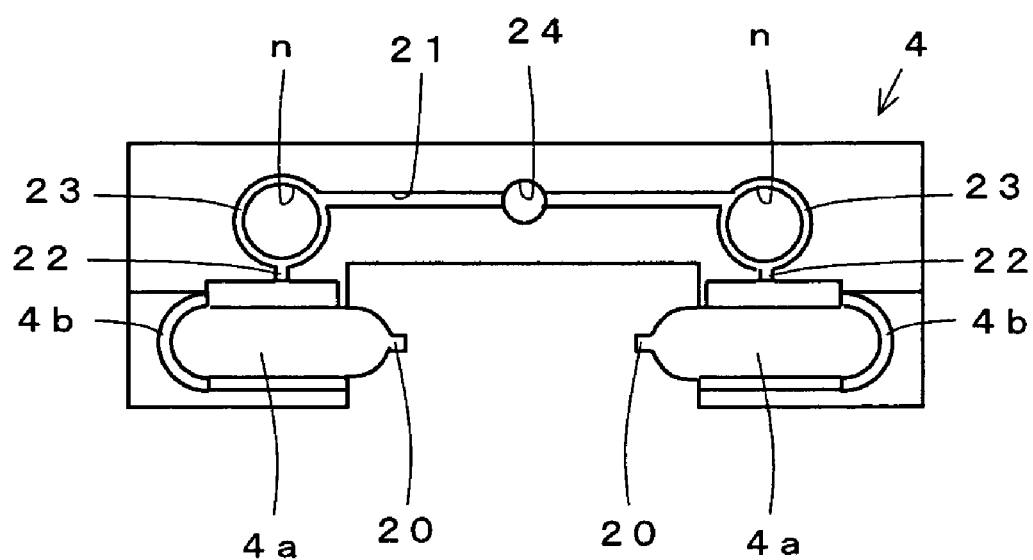
FIG. 5 is a plan view of an end cap 4.
Figure 6:
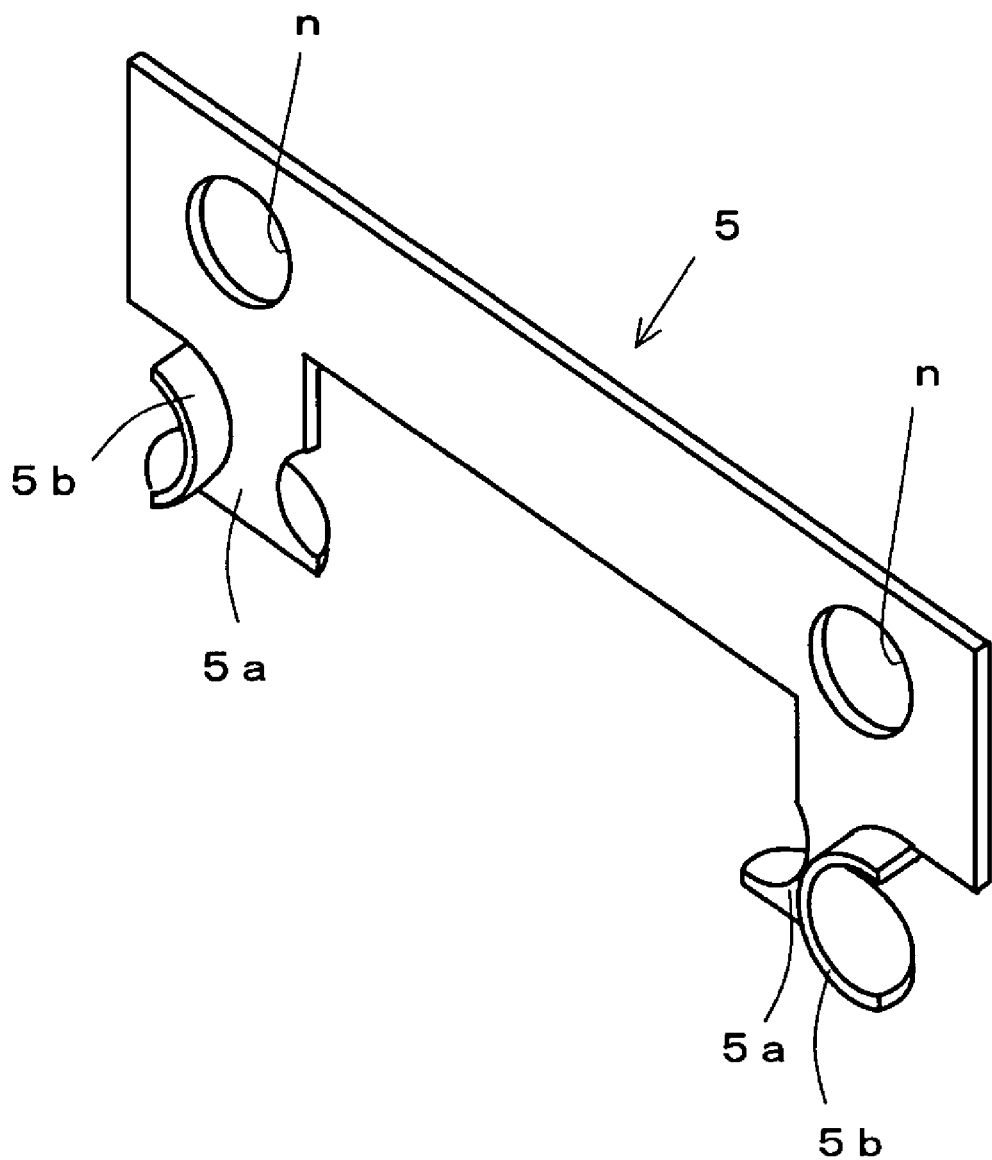
FIG. 6 is a perspective view of a spacer 5 as viewed from the side where the spacer is mounted on a casing.

Above the grooves 4a, 4a there are formed screw holes n, n to insert the screws N, N. And around these screw holes n, n, as shown in FIG. 5, concavities 23 are formed and these concavities 23, 23 are caused to communicate with each other via a first oil groove 21.

The above-described first oil groove 21 communicates with an oil supply hole 24, and a lubricant is supplied from this oil feeding hole 24 to the first oil groove 21. The lubricant which has been supplied to this first oil groove 21 is guided via the concavities 23, 23 to a second oil groove 22 and supplied from this second oil groove 22 to the grooves 4a, 4a.

Figure 7:
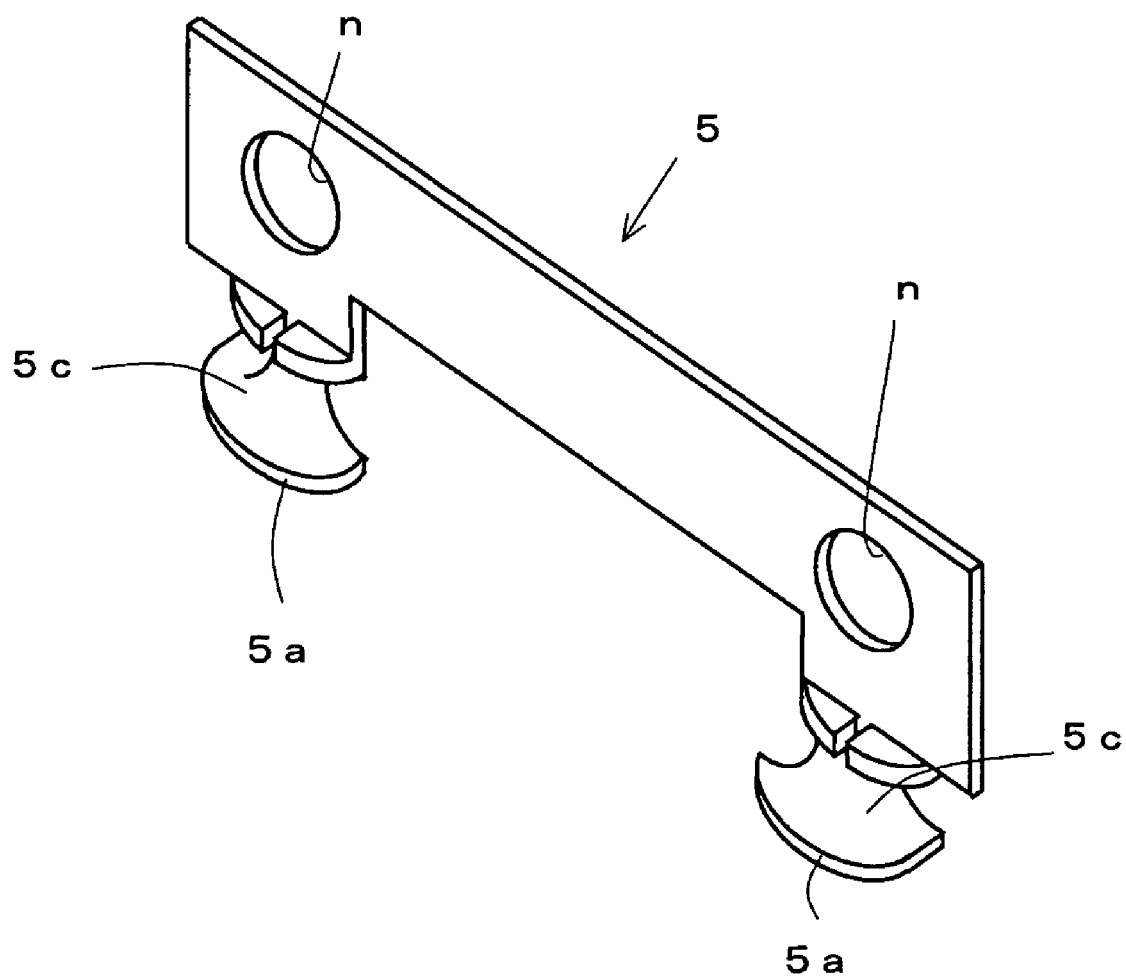
FIG. 7 is a perspective view of a spacer 5 as viewed from the side where the spacer is mounted on an end cap.
Figure 8:
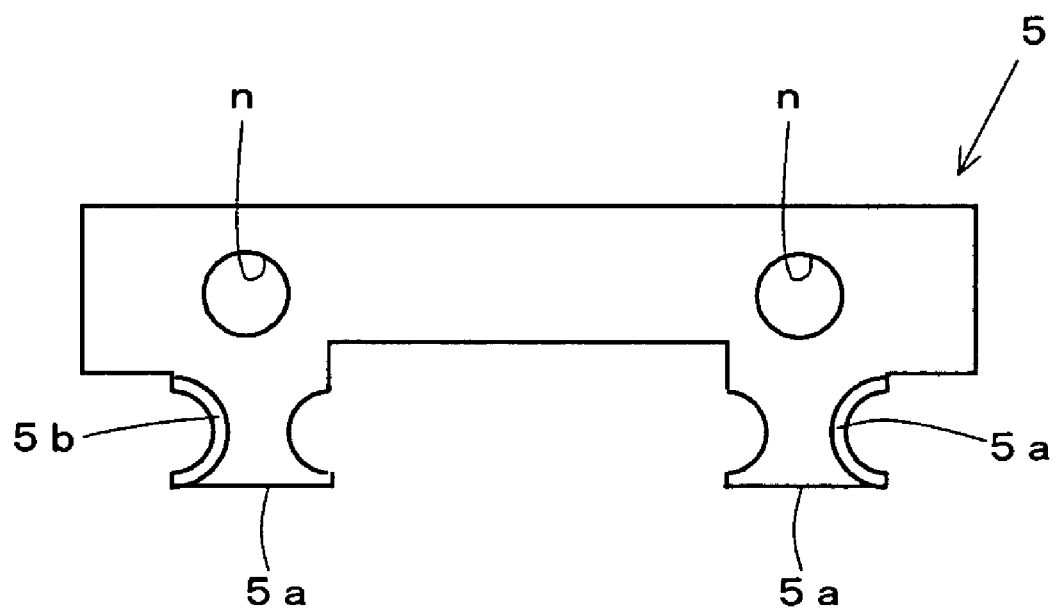
FIG. 8 is a front view of a spacer 5 on the side where the spacer is mounted on a casing.
Figure 9:
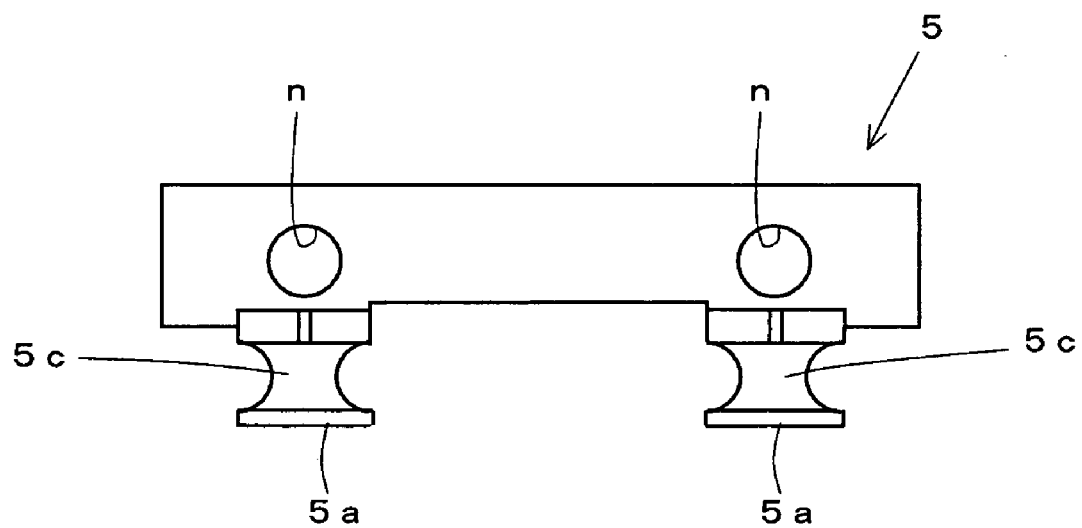
FIG. 9 is a back view of a spacer 5 on the side where the spacer is mounted on an end cap.

The above-described spacer 5 is, as shown in FIG. 6 to FIG. 9, provided with a pair of passage component members 5a, 5a and the semicylindrical convexities 5b, 5b. The passage component members 5a, 5a have circular arc guide surfaces 5c, 5c as shown in FIG. 7. Furthermore, screw holes n, n are formed in the spacers 5, 5.

Figure 10:
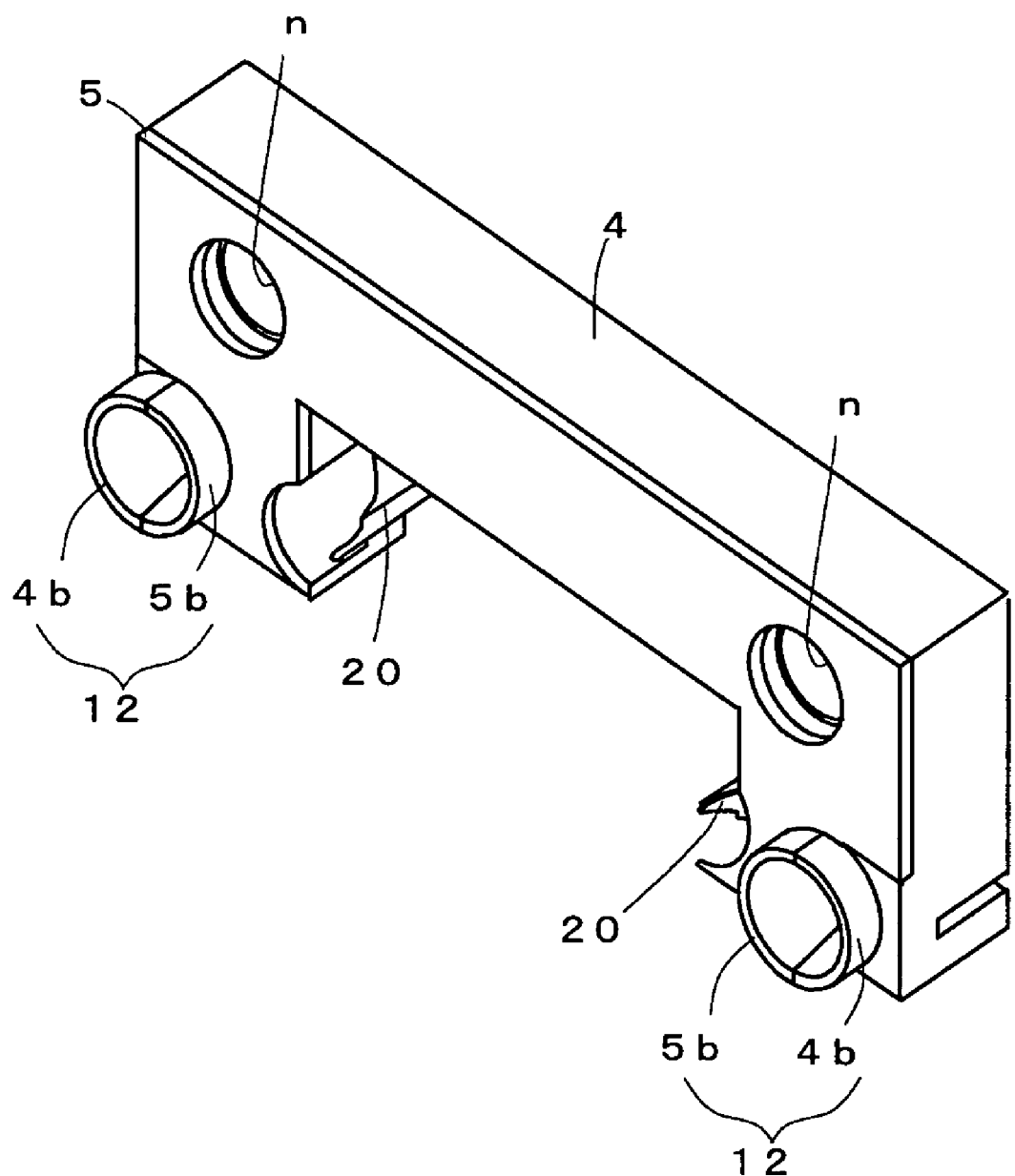
FIG. 10 is a perspective view of a spacer 5 assembled in an end cap 4.
Figure 11:
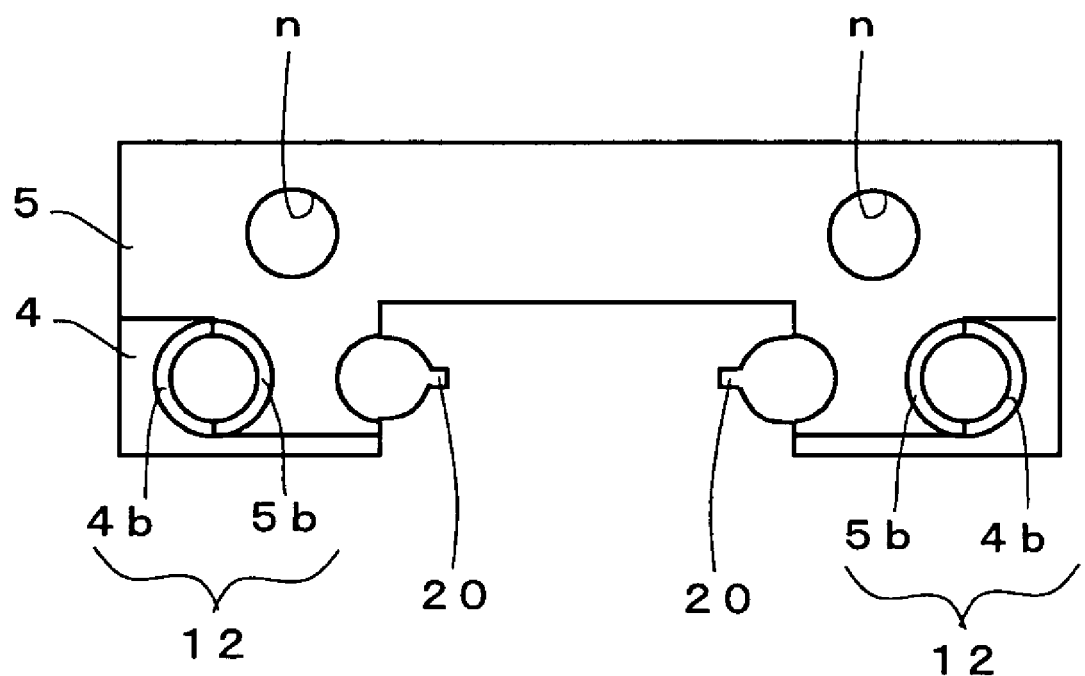
FIG. 11 is a plan view of a spacer 5 assembled in an end cap 4.

The spacer 5 constructed as described above is assembled to the end cap 4 as shown in FIGS. 10 and 11. When the spacer 5 is assembled in this manner, as shown in FIG. 3, the grooves 4a, 4a provided in the end cap 4 and the passage component member 5a provided in the spacer 5 jointly constitute U-shaped direction changing paths 9, 9. The direction changing paths 9, 9 formed in this manner cause one opening thereof to communicate with the above-described raceway path a and the other opening thereof to communicate with the above-described return path c. And by ensuring the communication between the raceway path a and the return path c via the direction changing path 9, the raceway path a, direction changing path 9 and return path c jointly constitute an endless circulation path. A large number of metal balls b are put in this circulation path and the balls are caused to perform rolling motions at the contact point between the rail 1 and the slider 2 to ensure smooth motions of the slider 2 with respect to the rail 1.

When the slider 2 moves as described above, the balls b roll in association with the movement. At this time, each ball b circulates continuously via the raceway path a→one direction changing path 9→the return path c→the other direction changing path 9.

Incidentally, as shown in FIG. 3, holding bands 11, 11 are mounted on the casing 3. The holding band 11 is provided to ensure that even when the slider 2 is removed from the rail 1, the balls b do not come off the raceway path a. This holding band 11 enters holding band clearance grooves 6c, 6c when the slider 2 is attached to the rail 1.

The above-described end cap 4 and spacer 5 are formed from a synthetic resin or metal having higher wear resistance than the oil retaining sleeve 8.

In order to maintain high accuracy movement of the slider 2 with respect to the rail 1 for a long period of time in the above-described arrangement, it is necessary not only to reduce the rolling resistance of the balls b, but also to minimize the wear of the rolls b themselves and the wear of the raceway path a and return path c on which the balls b perform rolling motions. For this purpose, it is necessary to periodically or continuously supply a lubricant to the above-described balls b, raceway path a, etc.

In this first embodiment, therefore, optimum lubrication is maintained by building the oil retaining sleeve 8 which is impregnated with a lubricant into the through hole 7. That is, the above-described oil retaining sleeve 8 is formed from a sintered resin material of porous structure which can contain a lubricant. And the rolling of the balls b within this oil retaining sleeve 8 causes the lubricant which is impregnated in the sleeve 8 to appropriately ooze to the surfaces of the balls b. The rolling of the balls b, to the surfaces of which the lubricant is supplied, on the circulation path causes the lubricant to be supplied also to the whole circulation path.

When the spacer 5 is assembled to the end cap 4 as shown in FIGS. 10 and 11, the convexity 4b provided on the end cap 4 side and the convexity 5b provided on the spacer 5 side jointly constitute a cylindrical guide member 12. And the guide member 12 is inserted into the through hole 7.

Furthermore, the above-described oil retaining sleeve 8 has a length shorter than the through hole 7 so that the spacing S is ensured from both ends of the oil retaining sleeve 8 to the end portion of the through hole 7 when the oil retaining sleeve 8 is assembled into the through hole 7. And this spacing S is equal to the length L of the above-described guide member 12. Therefore, when the guide member 12 is inserted into the through hole 7 as described above, the oil retaining sleeve 8 and the guide member 12 come into snug contact with each other.

Figure 12:
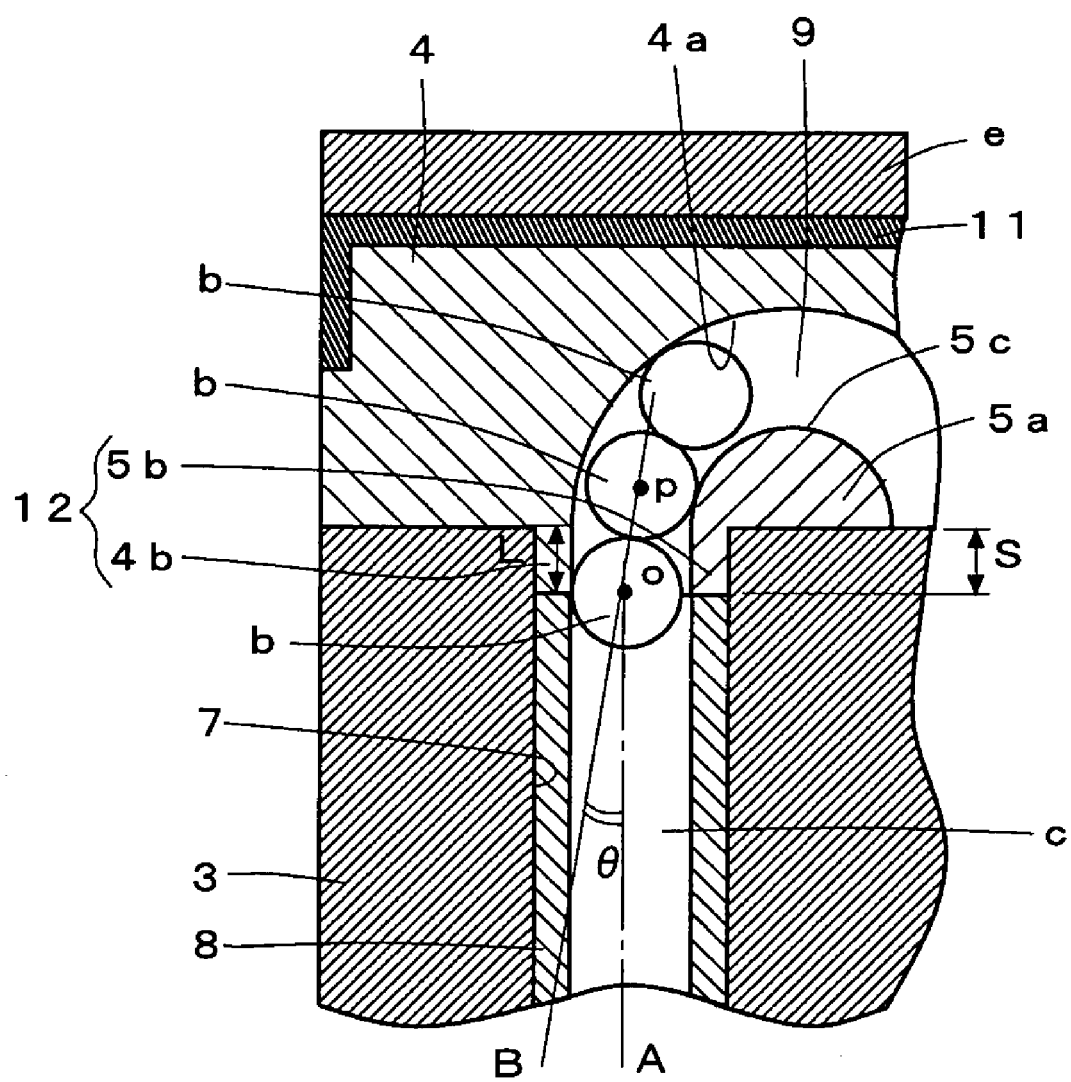
FIG. 12 is a partial sectional view of the first embodiment.

The oil retaining sleeve 8 and guide member 12 constructed as described above maintain the following dimensional relationship. That is, the outside diameter of the guide member 12 is almost equal to the inside diameter of the through hole 7 so that the guide member 12 fits snugly into the through hole 7. If the inside diameter of the guide member 12 is made equal to the inside diameter of the oil retaining sleeve 8 and as shown in FIG. 12, the guide member 12 is inserted into the through hole 7, then the mating surfaces of the two become flush, in other words, a level difference and the like are not formed on the mating surfaces of the two.

The length L of an insertion portion of the guide member 12 inserted into the through hole 7 is shorter than the diameter D of the ball b. For example, when the diameter of the ball b is 1.5875 mm and the length L of the guide member 12 is 1 mm, the ratio of the two L/D becomes 0.63.

When the ratio of the two L/D is set at 0.63 like this, the ball plunge angle θ becomes about 8 degrees. When a ball b comes into contact with the mating surface of the leading end of the guide member 12 and the oil retaining sleeve 8 in the state that as shown in FIG. 12, balls in the return path c are being pushed by balls in the direction changing path 9, this ball plunge angle θ is defined as the angle which is formed when a line B which connects the center o of the ball b and the center p of a ball b in contact with this ball b in the direction changing path 9 crosses the axis line A of the oil retaining sleeve 8. Incidentally, at this time, the above-described ball b the center of which is at the leading end of the guide member 12 is in contact with the inner wall of the mating surface of the leading end of the guide member 12 and the oil retaining sleeve 8, which inner wall is the left-hand one in the drawing, and the ball b in the direction changing path 9 is in contact with a guide surface 5c.

The above-described ball plunge angle becomes about 32 degrees when the guide member 12 is not provided. Therefore, when the guide member 12 is provided, the ball plunge angle can be reduced to about ¼ compared to the case where the guide member 12 is not provided. If the ball plunge angle is reduced in this manner, it becomes possible to reduce the component force F of the ball b orthogonal to the axis line A of the oil retaining sleeve 8 immediately before rolling into the oil retaining sleeve 8. If the component force F of the ball b reduces in this manner, it becomes possible to reduce the force when the ball b collides with the inner wall near the opening in the oil retaining sleeve 8. And it is apparent that the wear of the oil retaining sleeve 8 can be prevented by reducing the colliding force of the ball b.

Incidentally, because the end cap 4 and spacer 5 which constitute the above-described guide member 12 are formed from a synthetic resin or metal having higher wear resistance than the oil retaining sleeve 8, this guide member 12 scarcely wears.

Also, according to this first embodiment, the convexity 4b and convexity 5b which constitute the above-described guide member 12 are integrated with the end cap 4 and the spacer 5, and the outside diameter of this guide member 12 is made almost equal to the inside diameter of the through hole 7 and, therefore, the position of the end cap 4 relative to the casing 3 is determined when the guide member 12 is inserted into the through hole 7. That is, the guide member 12 has a positioning function. Because the guide member 12 has a positioning function like this, it is possible to make a special positioning projection and the like unnecessary.

Figure 13:
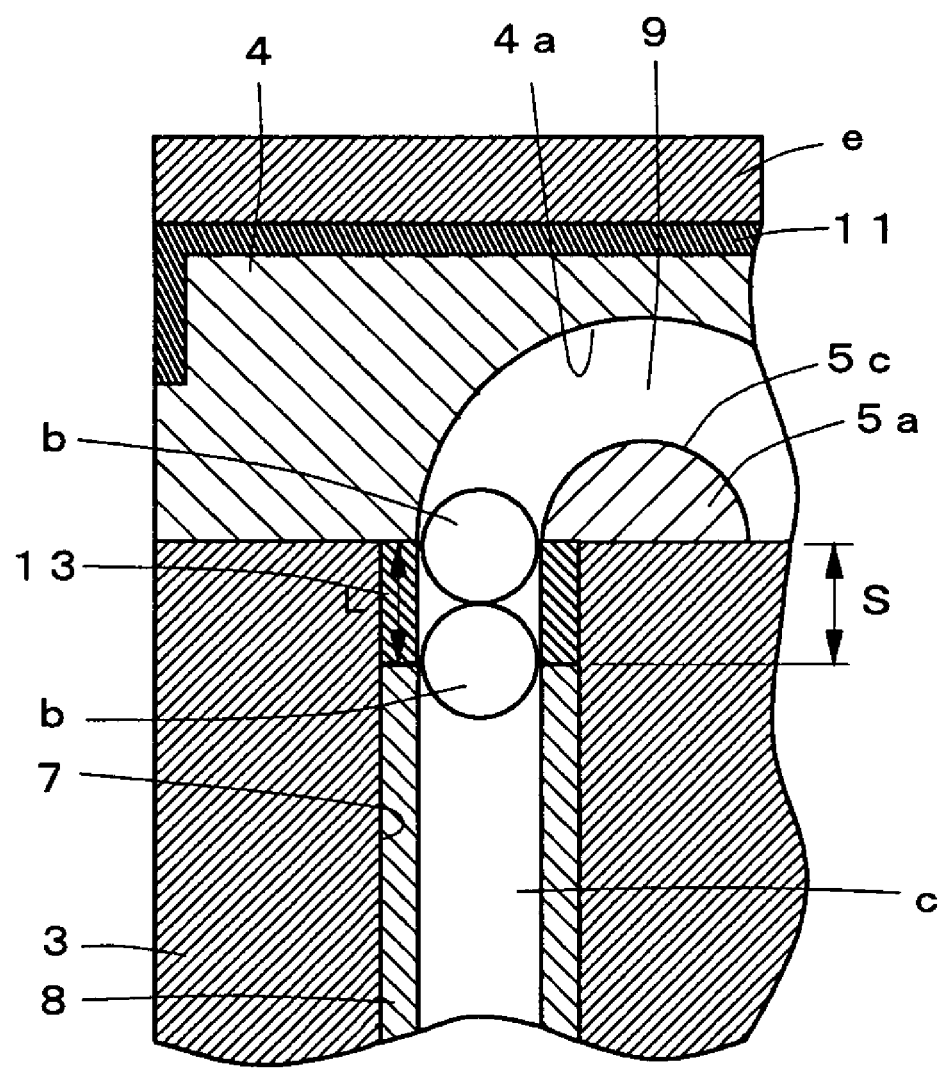
FIG. 13 is a partial sectional view of the second embodiment.

On the other hand, in the second embodiment shown in FIG. 13, a cylindrical guide member 13 is provided as a member separated from the end cap 4 and the spacer 5. That is, although in the above-described first embodiment the convexity 4b and convexity 5b which constitute the guide member 12 are integrated with the end cap 4 and the spacer 5, in this second embodiment the guide member 13 is provided as a member separated from the end cap 4 and the spacer 5. And the above-described guide member 13 is made of a synthetic resin having higher wear resistance than the oil retaining sleeve 8. If the guide member 13 is provided as a member separated from the end cap 4 and the spacer 5 like this, it is possible to simplify the shape of each part and hence the cost of manufacture becomes lower accordingly. Also, if the guide member 13 is provided as a member separated from the end cap 4 and the spacer 5 like this, it is possible to freely select the material. For example, the guide member 13 can be made of metal.

The length L of the above-described guide member 13 is such that when the oil retaining sleeve 8 is built into the through hole 7, the length L is equal to the spacing S which is formed from both ends of this oil retaining sleeve 8 to the end portion of the through hole 7. Therefore, when the guide member 13 is inserted into the through hole 7 as shown in FIG. 13, the oil retaining sleeve 8 and the guide member 12 come into snug contact with each other.

Furthermore, the guide member 13 has an outside diameter which fits snugly into the through hole 8 and has an inner diameter which is equal to the inner diameter of the oil retaining sleeve 8. Therefore, as shown in the figure, when the guide member 13 is inserted into the through hole 7, the mating surfaces of the two become flush. In other words, a level difference and the like are not formed on the mating surfaces of the two.

Furthermore, in this second embodiment, the total length L of the above-described guide member 13 is set at the same size as the diameter D of the ball b and the ratio L/D is set at 1.0.

In this case, the ball plunge angle becomes about 4 degrees and the ball plunge angle becomes about ⅛ compared to the case where the guide member 13 is not provided. Therefore, also in this second embodiment, by substantially reducing the ball plunge angle, it becomes possible to reduce the colliding force by the ball b and to prevent the wear of the oil retaining sleeve 8.

Figure 14:
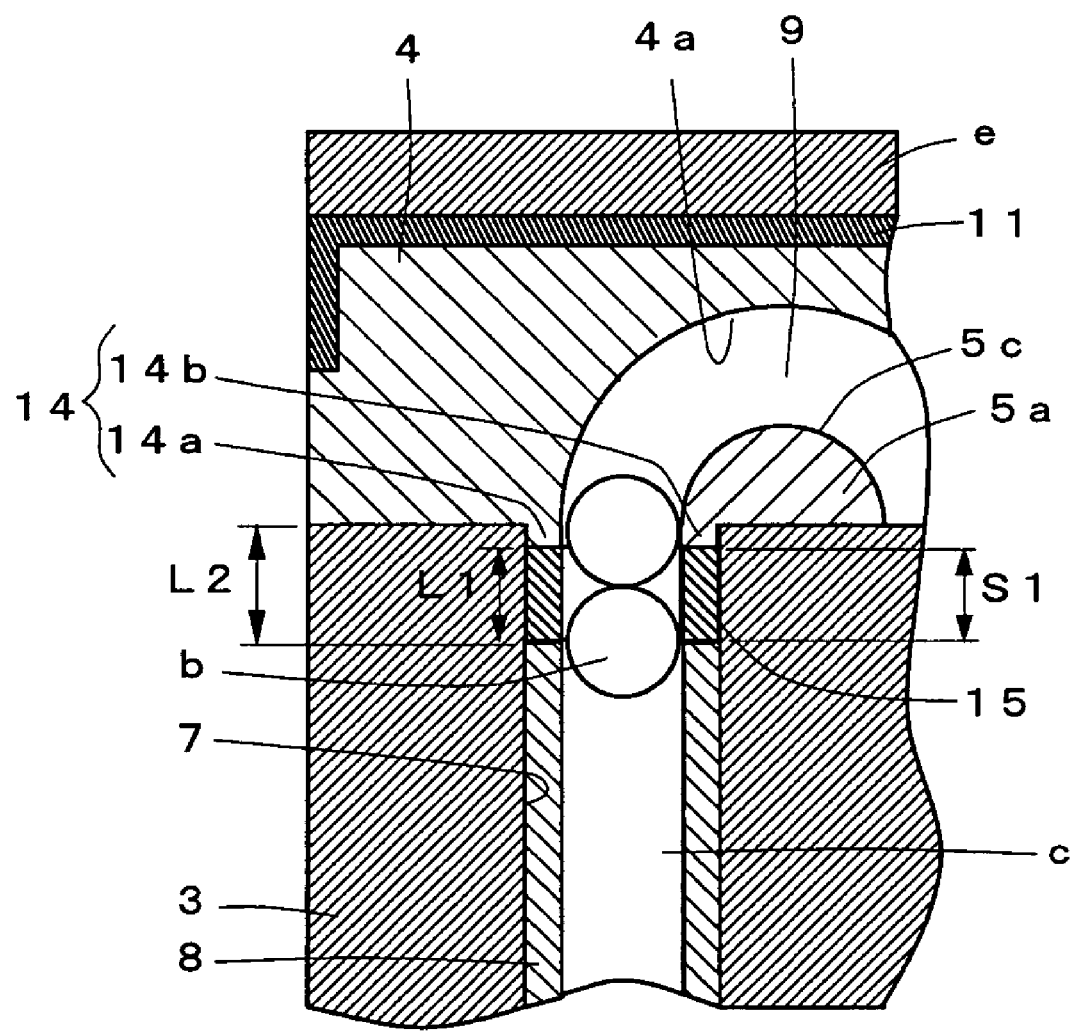
FIG. 14 is a partial sectional view of the third embodiment.
Figure 15:
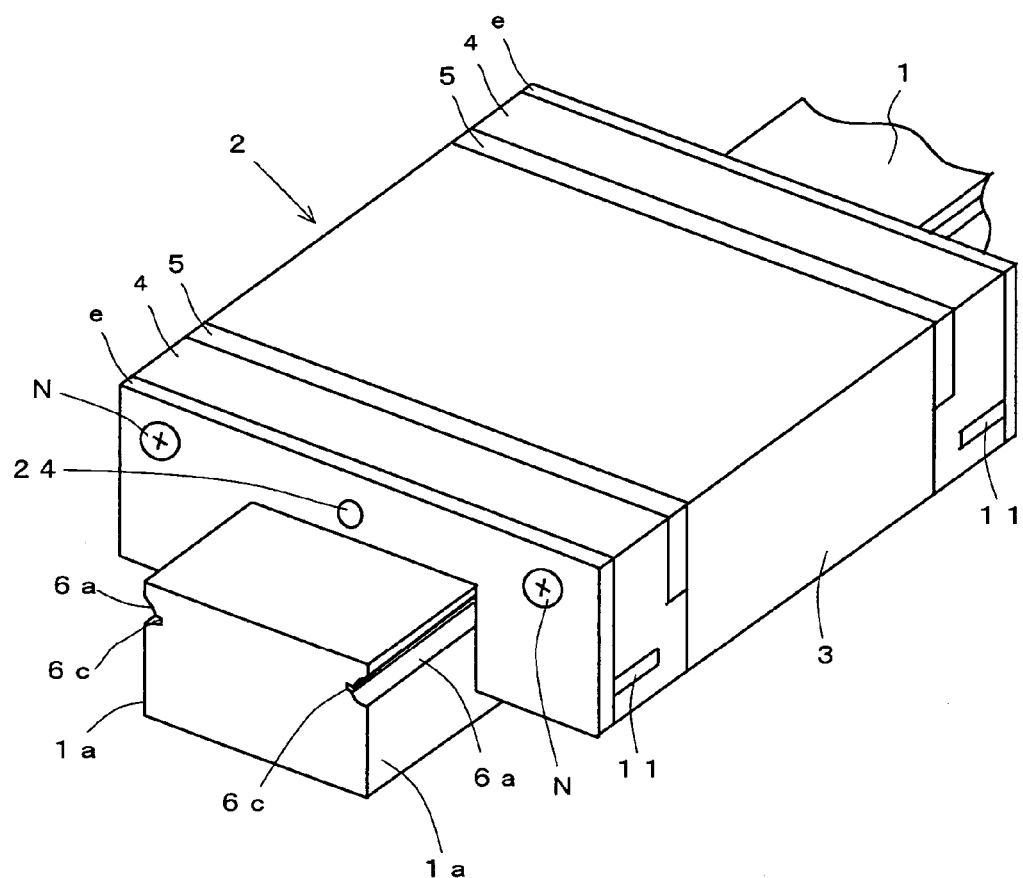
FIG. 15 is a perspective view of a conventional example.
Figure 16:
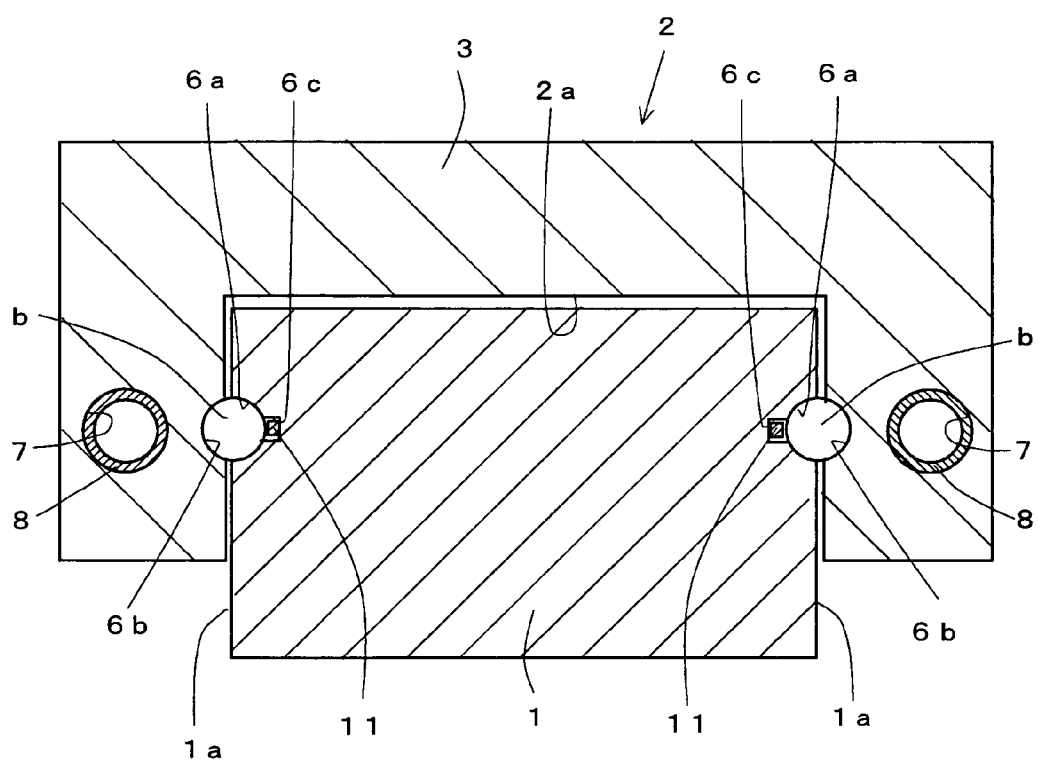
FIG. 16 is a sectional view taken along a plane orthogonal to the rail 1 in FIG. 15.
Figure 17:
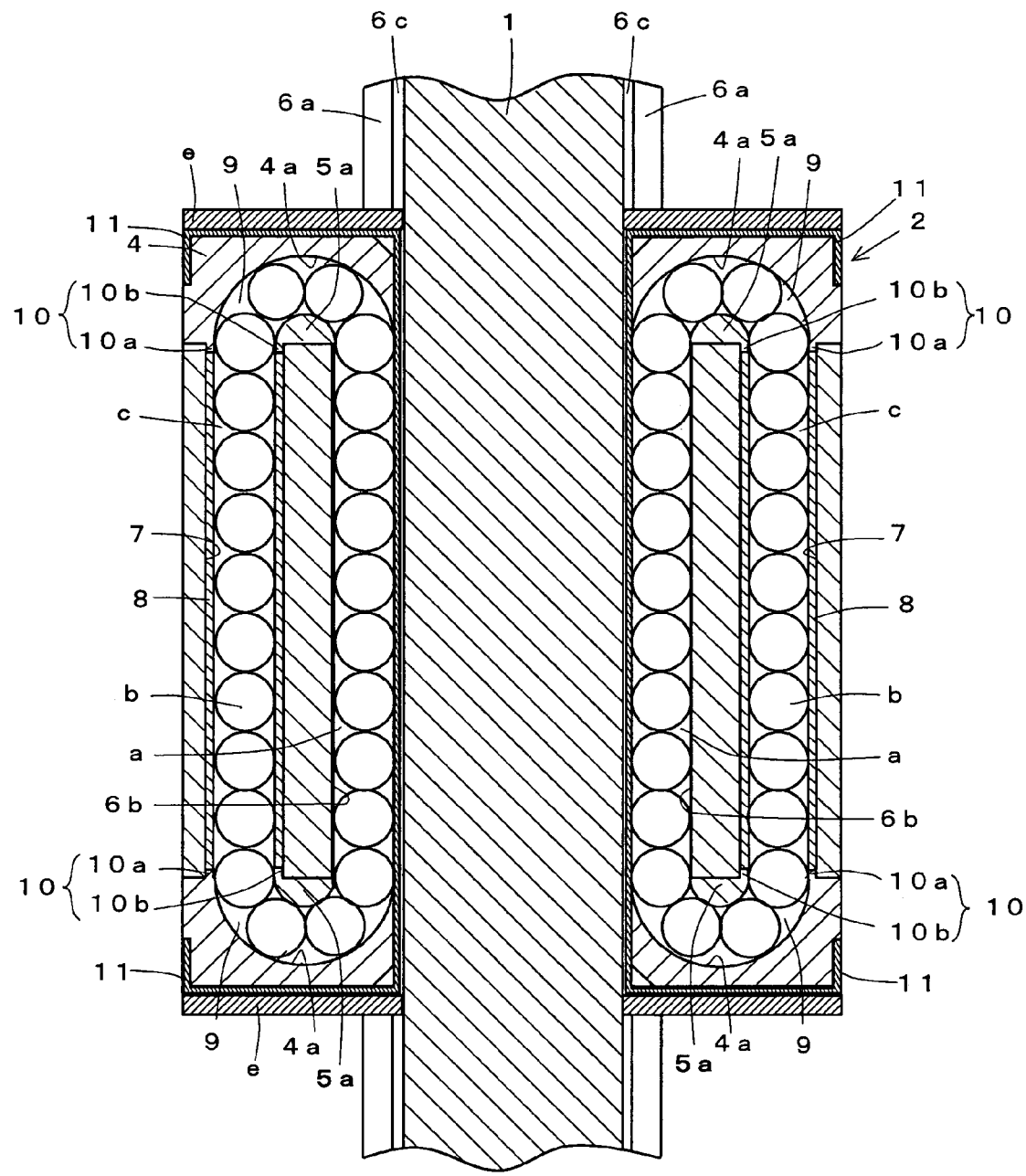
FIG. 17 is a sectional view taken horizontally to the rail 1 in the parts of holding band clearance grooves 6c, 6c in FIG. 15.
Figure 18:
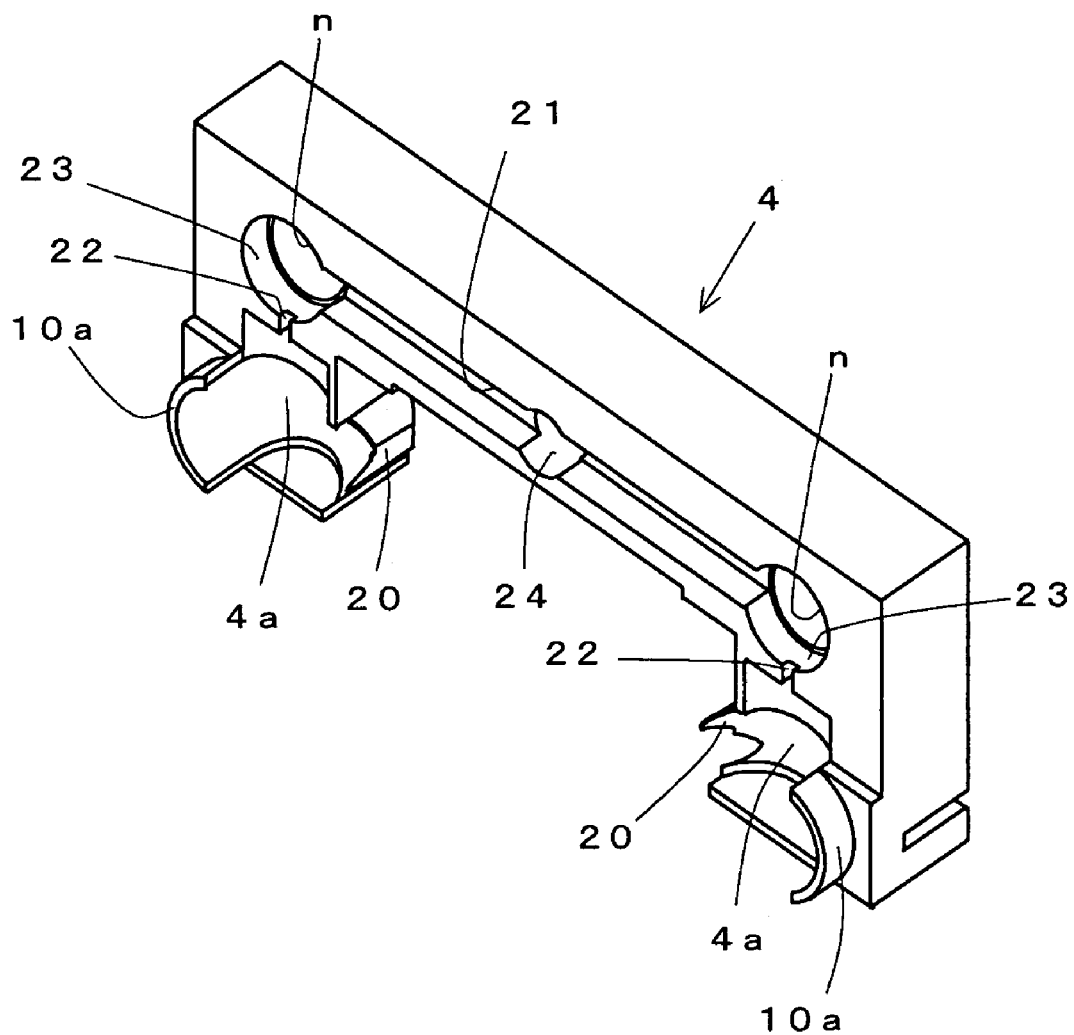
FIG. 18 is a perspective view of an end cap 4.
Figure 19:
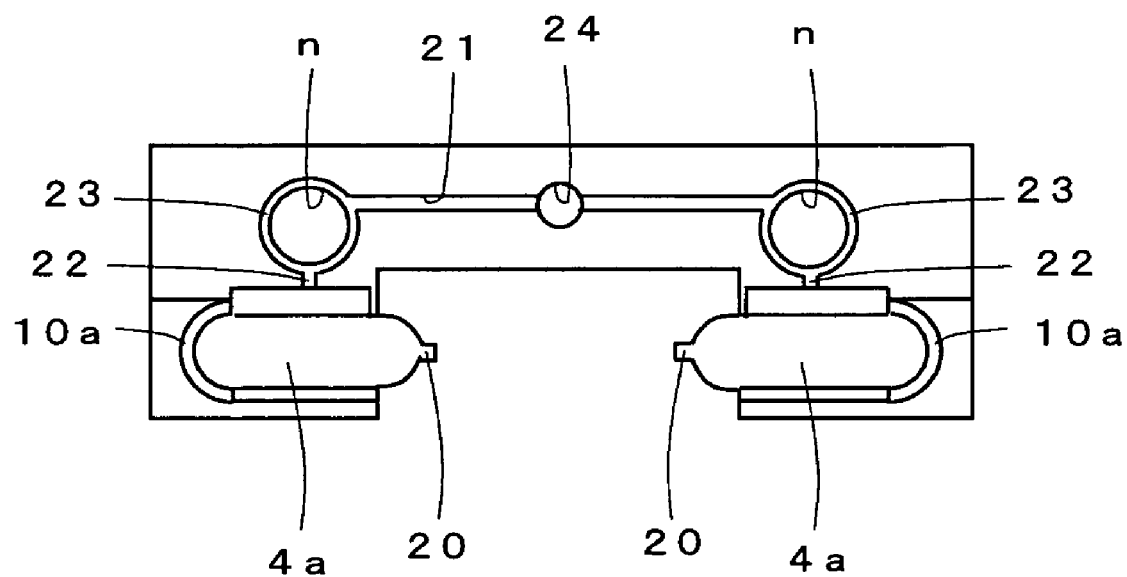
FIG. 19 is a plan view of an end cap 4.
Figure 20:
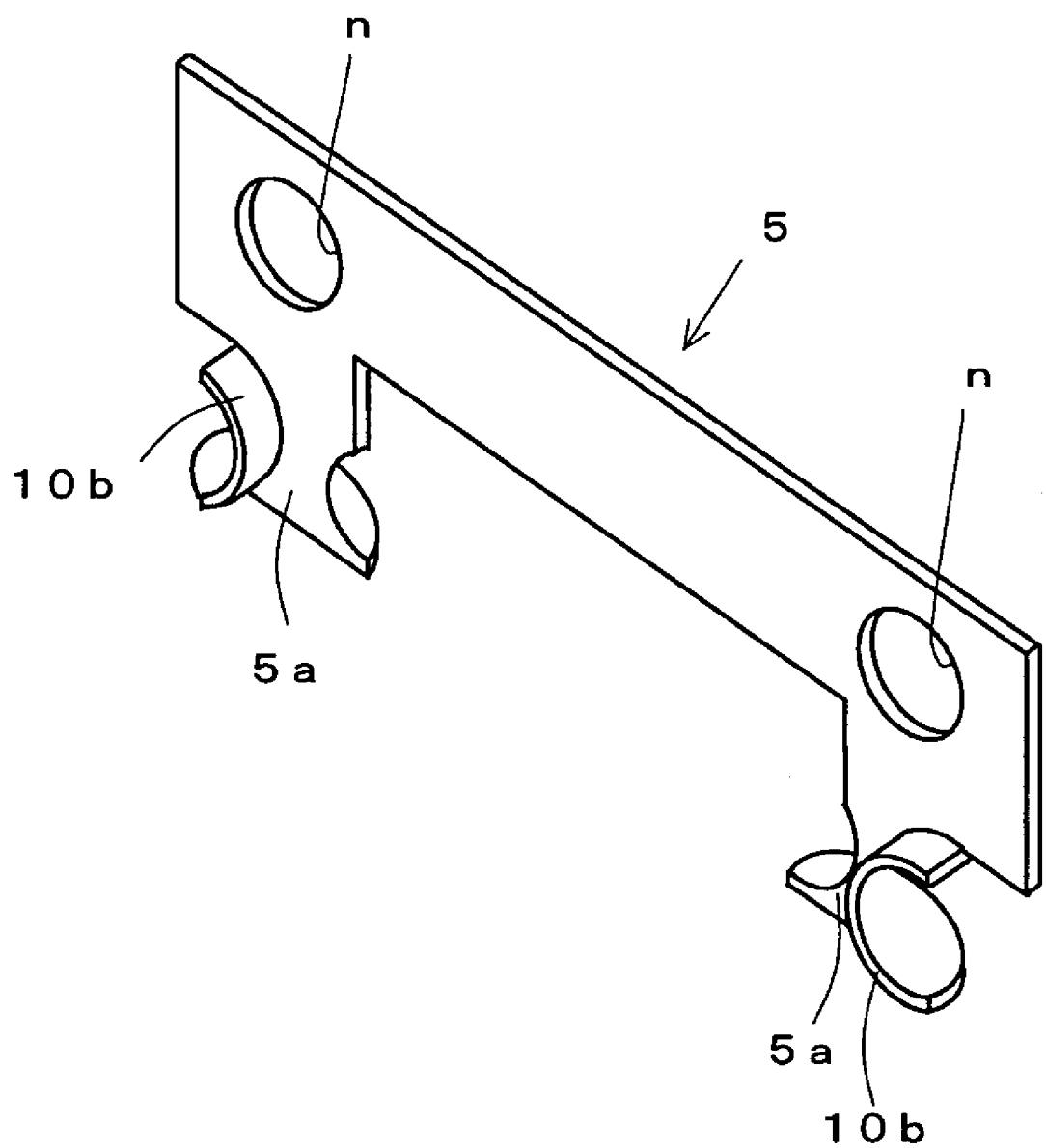
FIG. 20 is a perspective view of a spacer 5 as viewed from the side where the spacer is mounted on a casing.
Figure 21:
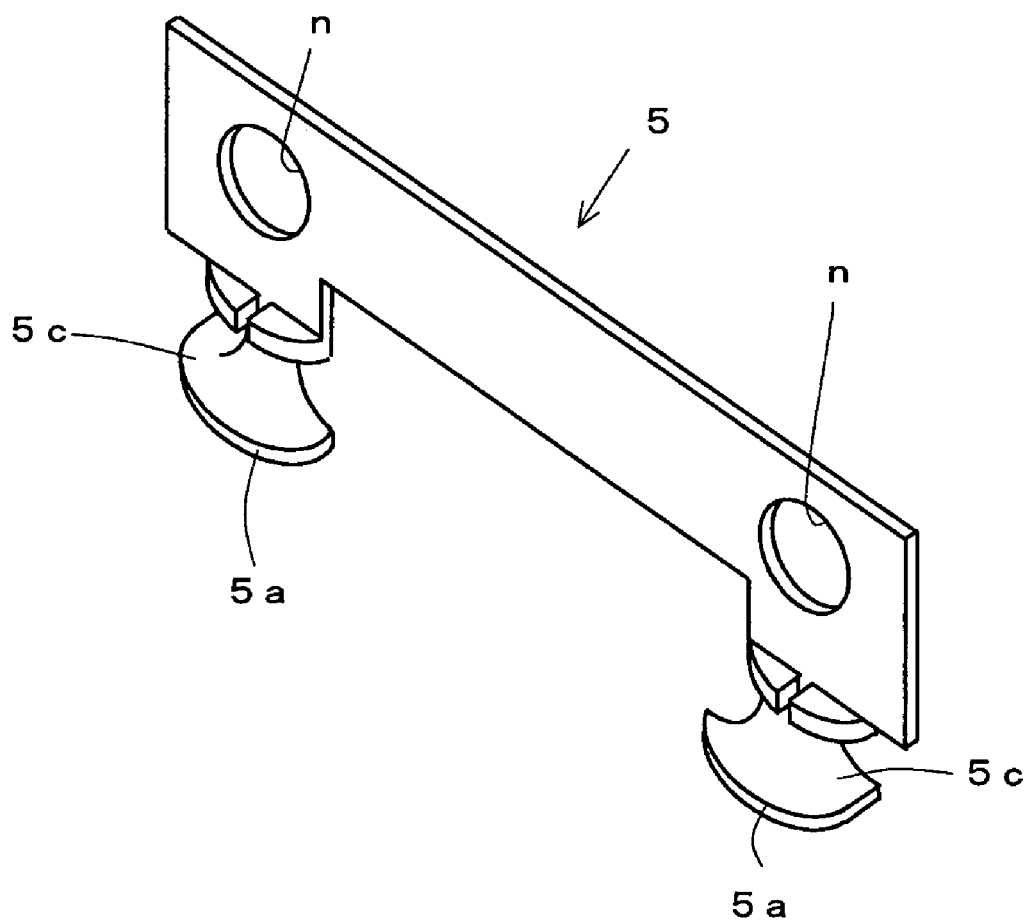
FIG. 21 is a perspective view of a spacer 5 as viewed from the side where the spacer is mounted on an end cap.
Figure 22:
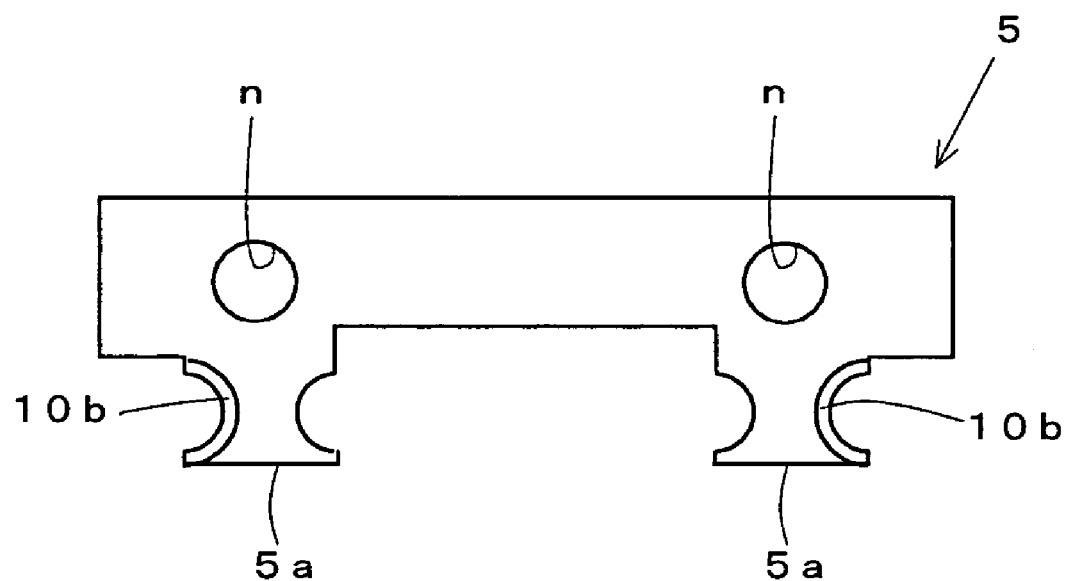
FIG. 22 is a front view of a spacer 5 on the side where the spacer is mounted on a casing.
Figure 23:
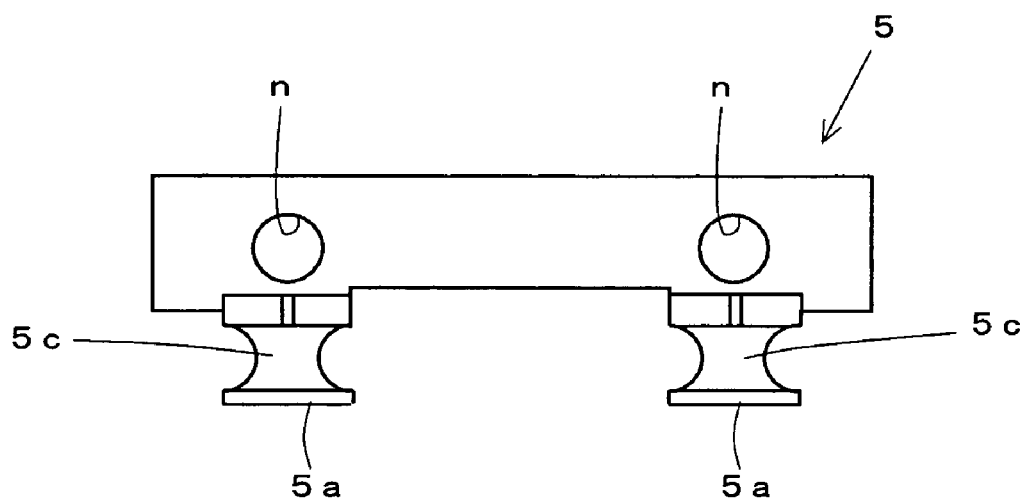
FIG. 23 is a back view of a spacer 5 on the side where the spacer is mounted on an end cap.
Figure 24:
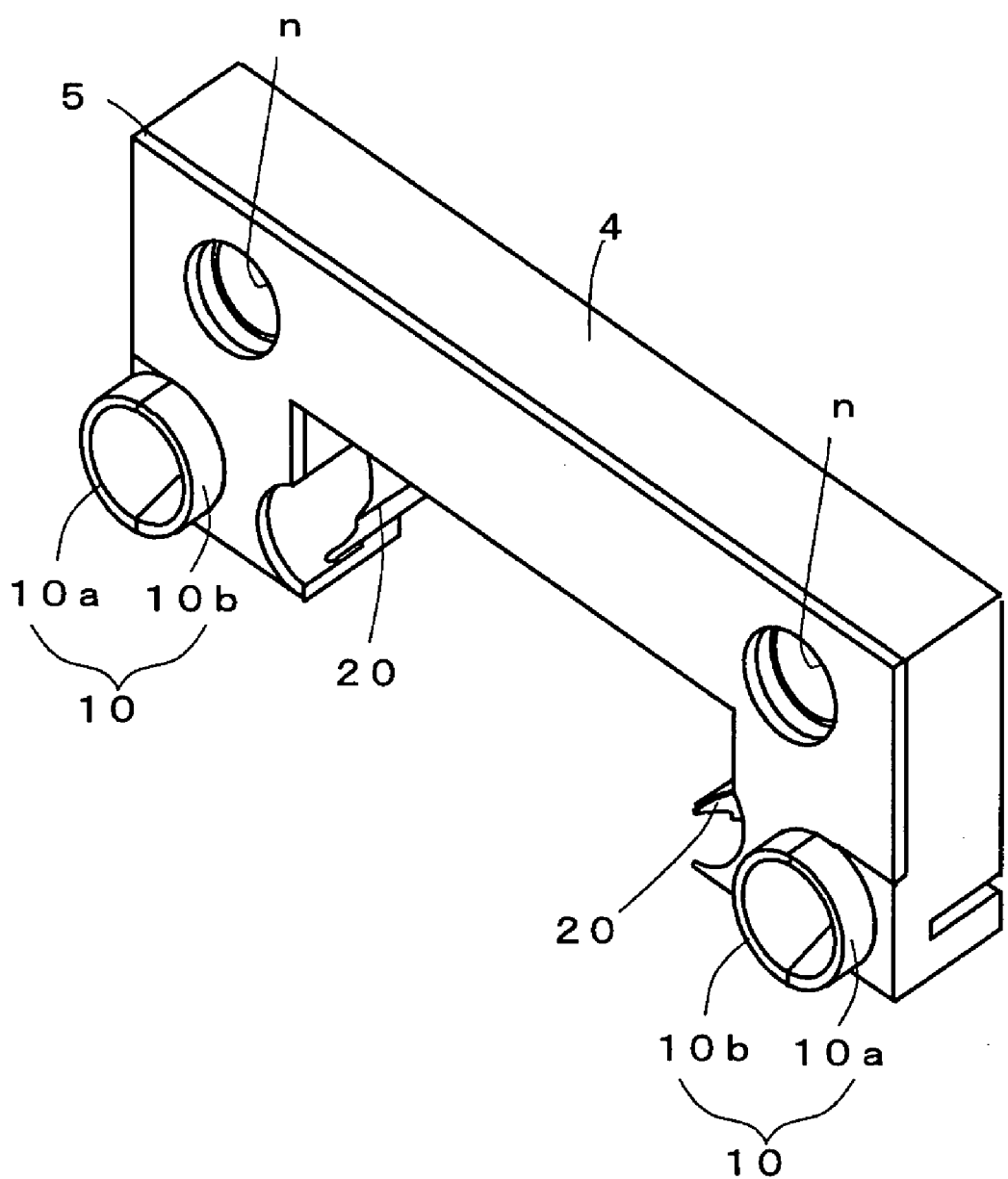
FIG. 24 is a perspective view of a spacer 5 assembled in an end cap 4.
Figure 25:
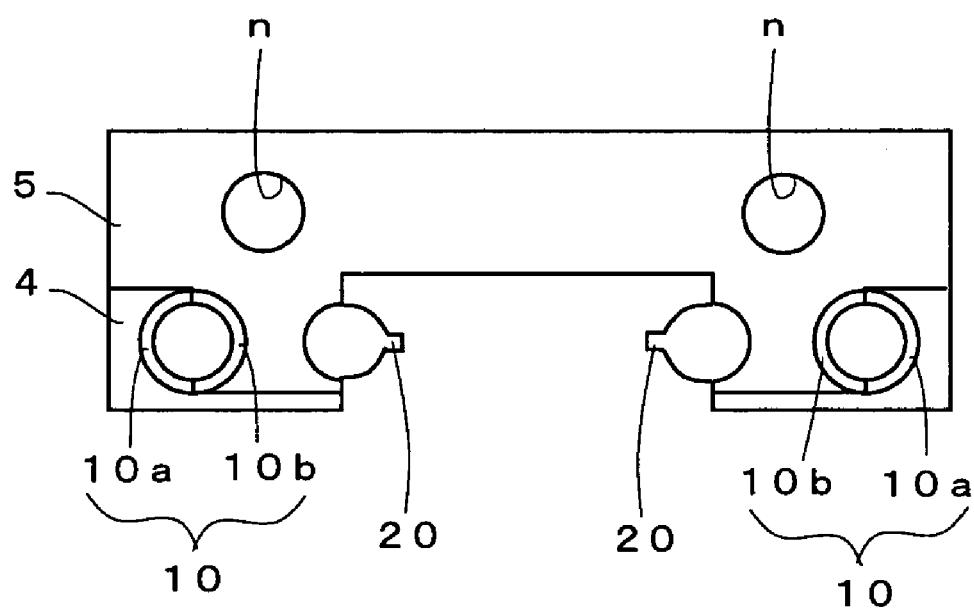
FIG. 25 is a plan view of a spacer 5 assembled in an end cap 4.

In the third embodiment shown in FIG. 14, a positioning cylinder 14 is constructed by providing semicylindrical connections 14a, 14b in the end cap 4 and the spacer 5, respectively, and by combining these connections 14a, 14b. And this positioning cylinder 14 is inserted into the through hole 7.

A cylindrical guide member 15 is interposed in the spacing S1 which is formed between the positioning cylinder 14 inserted into the through hole 7 in this manner and the oil retaining sleeve 8.

The above-described guide member 15 is also made of a material having higher wear resistance than the oil retaining sleeve 8, and the length L1 of this guide member is equal to the above-described spacing S1.

Therefore, when the guide member 15 is inserted into the through hole 7 as described above, the oil retaining sleeve 8 and the guide member 15 come into sung contact with each other.

Furthermore, the guide member 15 has an outside diameter which fits snugly into the through hole 8 and has an inner diameter which is equal to the inner diameter of the oil retaining sleeve 8. Therefore, as shown in the figure, when the guide member 15 is inserted into the through hole 7, the mating surfaces of the two become flush. In other words, a level difference and the like are not formed on the mating surfaces of the two.

Furthermore, in this third embodiment, the total length L2 of the above-described positioning cylinder 14 plus the guide member 15 is set at the same size as the diameter D of the ball b, and the ratio L2/D is set at 1.0.

Also in this case, the ball plunge angle becomes about 4 degrees and the ball plunge angle becomes about ⅛ compared to the case where the guide member 15 is not provided. Therefore, also in this third embodiment, by substantially reducing the ball plunge angle, it becomes possible to reduce the colliding force by the ball b and to prevent the wear of the oil retaining sleeve 8.

Also, according to this third embodiment, the connections 14a, 14b which constitute the positioning cylinder 14 are integrated with the end cap 4 and spacer 5, and the outside diameter of this positioning cylinder 14 is in a dimensional relation which permits snug fitting into the through hole 7, with the result that the position of the end cap 4 relative to the casing 3 is determined when the positioning cylinder 14 is inserted into the through hole 7. Therefore, it is possible to omit a special positioning projection and the like.

Furthermore, according to this third embodiment, the guide member 15 is provided separately from the end cap 4 etc. and, therefore, as with the second embodiment, the material for the guide member 15 can be freely selected. For example, the guide member 15 can be formed from a synthetic resin or metal having high wear resistance.

According to the above-described first to third embodiments, the ratio of the total length L of the guide member 12, 13 or the total length L2 of the positioning cylinder 14 plus the guide member 15 to the diameter D of the ball b, L/D (L2/D), is 0.63 or 1.0. It is good when this ratio L/D (L2/D) is in the range of 0.3 to 3.0, and this ratio is preferably in the range of 0.4 to 2.0. This is because when this ratio is in the above-described ranges, the ball plunge angle decreases, with the result that the wear of the oil retaining sleeve 8 can be prevented.

Incidentally, when the total length L of the guide member 12, 13 or the total length L2 of the positioning cylinder 14 plus the guide member 15 increases, the total length of the oil retaining sleeve 8 decreases by this amount. If the total length of the oil retaining sleeve 8 decreases more than necessary, the contact area relative to the ball b decreases and the amount of a retained oil also decreases, with the result that the lubrication function deteriorates. For this reason, it is preferred that the ratio of the length L (L2) of this guide member 12 etc. to the diameter D of the ball b be not more than 3.0 as described above.

Also, in the above-described first to third embodiments, the direction changing path 9 is constructed by assembling the spacer 5 in the end cap 4. However, it is also possible to form the direction changing path 9 only in the end cap 4. The spacer 5 can be omitted when the direction changing path 9 is formed in the end cap 4. That is, the spacer 5 is not an indispensable component element in the present invention. And when the spacer 5 is omitted, the guide member 12 in the above-described first embodiment is integrated with the end cap 4. It follows that the positioning cylinder 14 in the above-described third embodiment is also integrated with the end cap 4.

Furthermore, in the above-described first to third embodiments, descriptions were made of the guide unit of the type having a straight-line rail. However, the invention can also be applied to a guide unit of a type having a curved rail.

According to the first aspect of the invention, the guide member is interposed between the direction changing path of the end cap and the oil retaining sleeve, and the ratio of the length L of this guide member in the axis line direction and the diameter D of the rolling element, L/D, is set at 0.3 to 3.0. By interposing the guide member having such a length, it is ensured that the component force of the ball which has rolled into the oil retaining sleeve is reduced to almost zero, which component force is orthogonal to the axis line of the oil retaining sleeve. If the component force is reduced to almost zero like this, it is possible to minimize the colliding force of the ball relative to the oil retaining sleeve. Therefore, it is possible to prevent the wear of the inner wall near the opening in this oil retaining sleeve.

According to the second aspect of the invention, the guide member is integrated with the end cap, the outside diameter of this guide member is made equal to the inside diameter of the return path, and the guide member is given a positioning function. Therefore, it is unnecessary to provide a special positioning member in the end cap.

What is claimed is:

1. A guide unit comprising:
   a slider provided on a rail, the slider comprising a casing and an end cap, the end cap provided at least at one end of the casing,
   the slider including a raceway path formed by said casing and said rail;
   a direction changing path provided in the end cap;
   a return path provided in said casing; and
   an oil retaining sleeve of porous structure inserted into the return path;
   wherein the slider circulates rolling elements in said raceway path, said direction changing path and said oil retaining sleeve, and
   wherein a cylindrical guide member is interposed between the direction changing path of the end cap and the oil retaining sleeve, the guide member being distinct from the casing and distinct from the end cap; and
   the ratio of the length in the axis line direction of the guide member to the diameter of the rolling element is 0.3 to 3.0.

* * * * *